Figure 1:
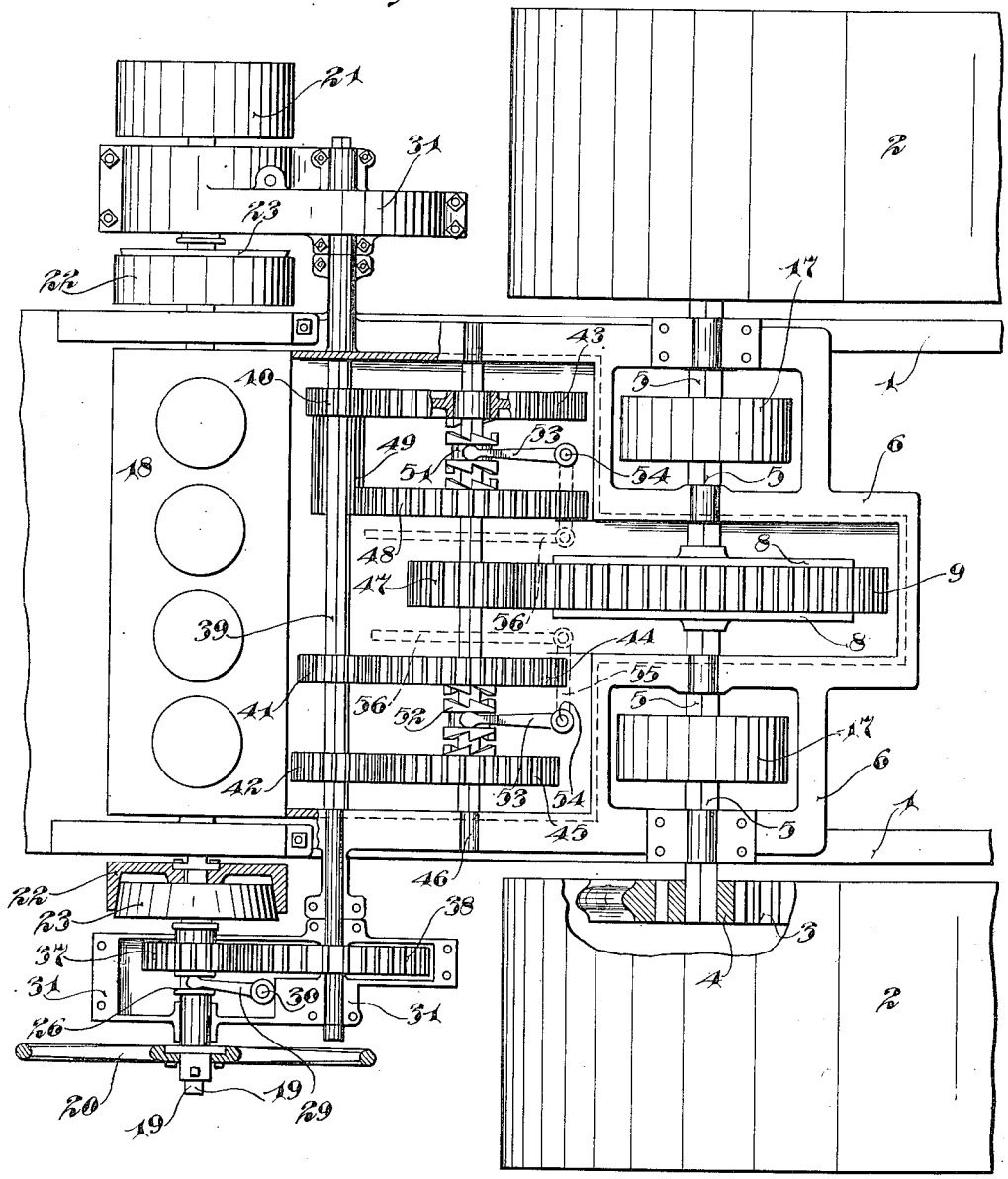

F. L. LUCKE.
POWER TRANSMISSION MECHANISM.
APPLICATION FILED NOV. 18, 1910.

1,125,140.

Patented Jan. 19, 1915.

2 SHEETS—SHEET 1.

Witnesses:
E. C. Skinkle.
Harry Opsahl.

Inventor:
Frank L. Lucke
By his Attorneys,
Williamson Merchant

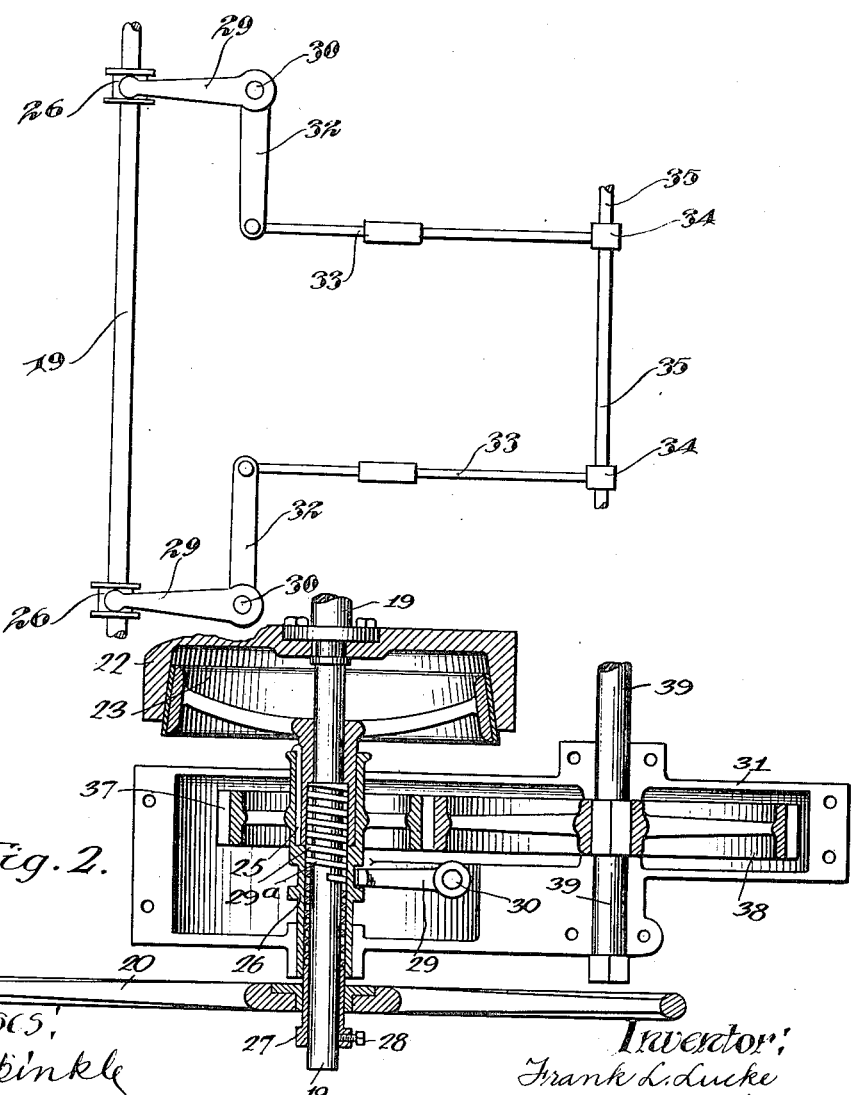

UNITED STATES PATENT OFFICE.

FRANK L. LUCKE, OF MINNEAPOLIS, MINNESOTA.

POWER-TRANSMISSION MECHANISM.

1,125,140.  Specification of Letters Patent.  Patented Jan. 19, 1915.

Application filed November 18, 1910. Serial No. 592,982.

*To all whom it may concern:*

Be it known that I, FRANK L. LUCKE, a citizen of the United States, residing at Minneapolis, in the county of Hennepin and State of Minnesota, have invented certain new and useful Improvements in Power-Transmission Mechanism; and I do hereby declare the following to be a full, clear, and exact description of the invention, such as will enable others skilled in the art to which it appertains to make and use the same.

My invention has for its object to provide an improved power transmission mechanism especially adapted for use on gasolene tractors, or in other words, upon tractors employing explosive engines in the general arrangement disclosed and claimed in my companion application filed of date, November 18th, 1910, under Serial Number 592,981, and entitled Gasolene tractor.

To the above end the invention consists of the novel device and combination of devices hereinafter described and defined in the claims.

In the accompanying drawings which illustrate the invention like characters indicate like parts throughout the several views.

Referring to the drawings: Figure 1 is a plan view with some parts broken away, with some parts sectioned and with some parts removed, showing the improved transmission mechanism arranged to transmit power from the crank shaft of a multi-cylinder explosive engine, to the traction wheels of the tractor. Fig. 2 is a horizontal section taken in a horizontal plan of the axis of the engine crank shaft showing one of the friction clutches of certain of the gears of the transmission mechanism, some parts being broken away; and Fig. 3 is a diagrammatic plan view showing the clutch actuating mechanism.

The numeral 1 indicates the horizontally disposed truck frame and the numeral 2, the rear traction wheels of a gasolene tractor which, as shown, is of the type disclosed in my said companion application above identified. The traction wheels 2 are provided with the customary internal spur gears 3. These gears 3 are in mesh with spur pinions 4 secured to the projecting ends of a longitudinally divided or two part shaft 5 mounted in suitable bearings afforded by a large gear case 6 which is made up of a lower section and an upper section, not shown, the former of which is rigidly secured on the truck frame 1. The inner ends of the section of the divided shaft 5 abut at the transverse center of the truck frame, and as shown are made square in cross section and fit in corresponding seats in the abutting hubs of a pair of internal spur gears 8 of a differential gear device. For the purpose of this case, it is not thought necessary to fully illustrate this differential gear device and therefore only the spur gears 8 and the large spur gear 9 herein designated as a master gear, as shown.

In Fig. 1 the numeral 17 indicates drums carried by the shaft section 5 and to which brake bands not shown may be applied.

The engine employed is a multi-cylinder explosive engine which is indicated as an entirety by the numeral 18 and the crank shaft of which is indicated specifically by the numeral 19. This engine is located upon the truck frame, in front of the traction wheels, and the base thereof is bolted or otherwise rigidly secured to the truck frame 1. At one extreme end the engine crank shaft 19 is shown as provided with a starting wheel 20, and at its other end with a driving pulley 21. At each side of the engine the crank shaft 19 has a rigidly secured clutch member 22 formed with the internal conical seat which is adapted to be engaged by external conical clutch members 23.

The clutch members 23 are free for both rotary and sliding movements on the engine crank shaft and as shown are provided with sleevelike hubs 24 that are rigidly secured by keys 25 to sleevelike hub extensions 26. The starting wheel 20 instead of being directly and rigidly secured to the engine crank shaft is as shown secured to the projecting end of the sleeve 26, and a spring resisting abutment, in the form of a small sleeve 27, is rigidly secured to the crank shaft 19 by a set screw 28, and telescoped into the said sleeve 26. A coiled spring 29 which surrounds the end of the crank shaft 19 re-acts against the sleeves 24 and 27 and tends to hold the clutch members 22 and 23 in frictional engagement with each other. The sleeve 26 has an annular groove that is engaged by the end of a clutch reversing lever 29.

The two clutch levers 29 are secured to short upright shafts 30 that are mounted in and depend from gear cases 31 suitably supported from the truck frame. Arms 32 are secured to the lower ends of the shaft 30 and are connected by links 33 to arms 34 of a transverse rock shaft 35 mounted in suitable bearings on the truck frame 1. By oscillatory movements of the rock shaft 35 the two clutches 22—23 may be simultaneously thrown into action or simultaneously thrown out of action. Suitable connections (not shown) may be provided for rocking the said shaft 35.

The clutch driven sleeves 26 are provided with spur gears 37 that mesh with larger spur gears 38 carried by a transverse counter shaft 39 mounted in bearings afforded by the gear case 6 and gear cases 31. The intermediate portion of the counter shaft 39 carries three spur gears 40, 41 and 42 that mesh respectively with spur gears 43, 44 and 45 that are loosely journaled on another counter shaft 46 journaled in the frame 36. The counter shafts 5, 39 and 46 are parallel to each other and to the engine crank shaft 19 and to the axis of the traction wheels 2, so that no bevel gears are employed in the transmission mechanism. The counter shaft 46 carries a centrally located spur pinion 47 that meshes with the master gear 9 of the differential gear devices. On the said counter shaft 46 is also journaled another spur gear 48 that meshes with a very wide faced spur pinion 49. This spur pinion 49 meshes also with the pinion 40 of the over-lying counter shaft 39, and it is itself carried by a counter shaft 50 located below said counter shaft 39 and journaled in the sides of the gear case 6.

The gears 43 and 48 are provided on their hubs with half clutches that are adapted to be engaged at will by a clutch sleeve 51 that is mounted to slide upon, but to rotate with the counter shaft 46. The gears 44—45 likewise are provided on their hubs with half clutches that are adapted to be engaged at will by clutch sleeve 52 mounted to slide upon but to rotate with said counter shaft 46. The clutch sleeves 51 and 52 as shown are subject to shipper levers 53 secured to short vertical shafts 54 journaled in the bottom of the gear case section 6 and provided at their lower ends with arms 55, the ends of which are connected to operating links 56. The links 56 may be extended to operating levers or to other suitable controlling devices the construction of which constitutes no part of the present invention.

It may be here stated that the forward movement of the tractor is produced by coupling one or the other of the gears 43, 44 or 45 to the counter shaft 46, and the reverse or backward travel of the tractor is produced by coupling the gear 48 to the said counter shaft 46. Attention is also called to the fact that the gear 44 is smaller than the gear 43 and that the gear 45 is smaller than the said gear 44, and furthermore that the pinion 41 is larger than the pinion 40 and that the pinion 42 is larger than said pinion 41.

The drums 17 which as already described, are carried by the divided shaft 5, may be used in connection with friction brake bands not shown, and thus an efficient brake mechanism provided. The starting wheel 20, as shown, is directly secured to the sleeve 27 which in turn is rigidly secured to the shaft 19. The pulley 21 is preferably secured to the clutch driven sleeve 26 which is located at the other side of the machine. This provides an arrangement whereby the wheel 20 is always effective to rotate the engine crank shaft, as required to start the engine, and wherein the clutch 21 which serves to transmit power from the engine to some other machine, can be left idle while the engine is being started and coupled to the engine crank shaft after the latter has acquired the desired speed.

The operation of the transmission mechanism briefly summarized is substantially as follows—after the engine has been started the counter shaft 39 may be driven from the engine by simultaneously throwing the two clutch devices 22 and 23 into action and this as already stated may be accomplished by suitable devices for imparting oscillatory movements to the common rock shaft 35. By manipulation of the clutch sleeves 51 and 52, in a manner already described, the tractor may be driven forward at slow speed or at intermediate speed or at high speed, or the tractor may be driven backward at slow speed. The compensating gear devices 8, 9, and associate parts provide the proper drive to the traction wheels traveling a curved line or in turning the tractor from a straight line course.

All of the counter shafts of the transmission mechanism are parallel to each other and to the engine crank shaft and to the axes of the traction wheels. This makes possible the use of simple spur gears and eliminates all beveled gears; and furthermore provides the simple, durable and generally efficient transmission mechanism for heavy tractors or traction rigs.

What I claim is:

1. The combination with a driving shaft, of a transmission mechanism and a pair of coöperating clutches arranged to simultaneously connect said transmission mechanism to the opposite ends of said driving shaft.

2. The combination with a driving shaft, of a transmission mechanism and a pair of coöperating clutches arranged to simultaneously connect said transmission mechanism to the opposite ends of said driving shaft, and means for simultaneously operating said two clutches.

3. The combination with a driving shaft and a driven shaft, of transmission devices connecting both ends of said two shafts and including a pair of coöperating clutches arranged to simultaneously throw the said transmission devices into action and simultaneously out of action.

4. The combination with a driving shaft and a driven shaft that is parallel therewith, of transmission devices connecting the said two shafts at both ends, a pair of clutches for throwing said transmission devices into and out of action, and means for simultaneously operating said clutches.

In testimony whereof I affix my signature in presence of two witnesses.

FRANK L. LUCKE.

Witnesses:
 ALICE V. SWANSON,
 HARRY D. KILGORE.